March 12, 1963 E. R. SCHUMANN 3,081,034
THERMOSTATIC SHUT-OFF VALVE
Filed Aug. 10, 1960 2 Sheets-Sheet 1
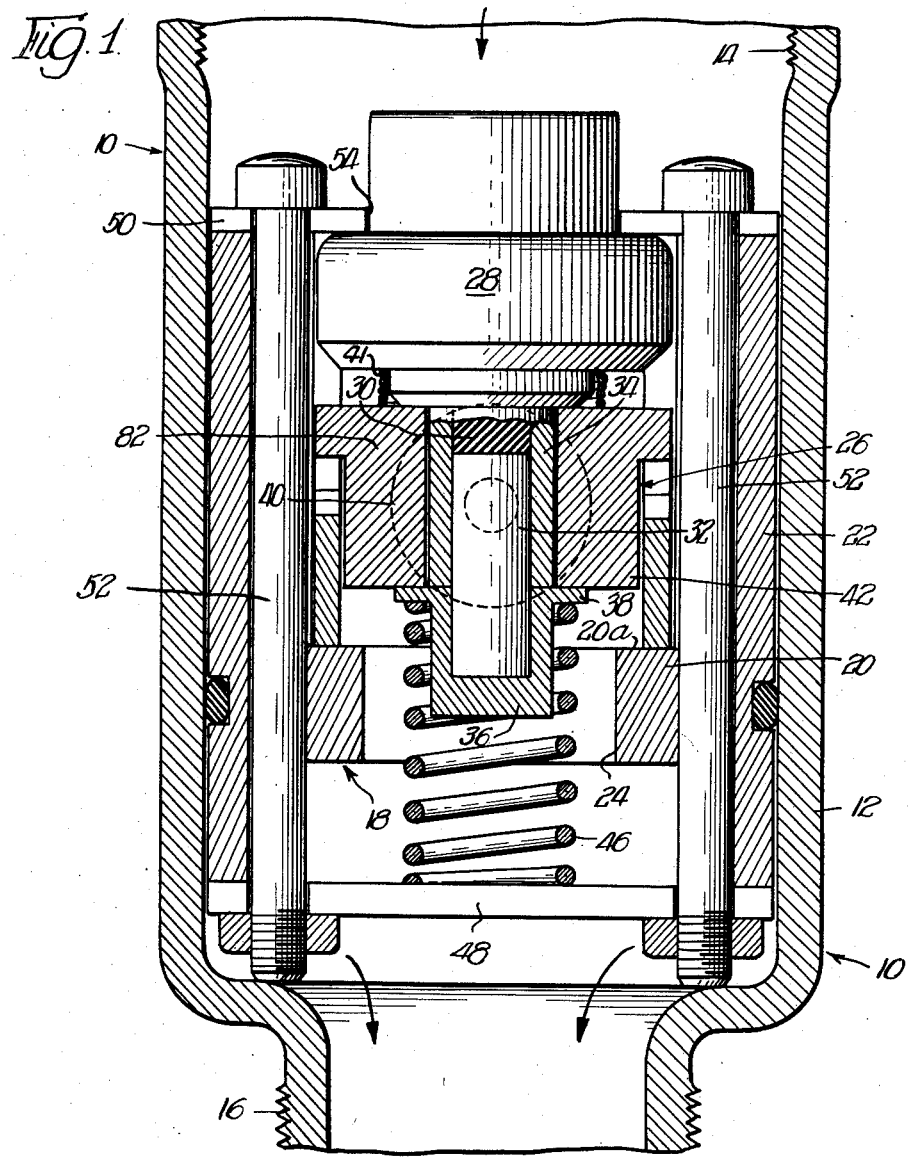
INVENTOR.
Eugene R. Schumann,
BY
Byron, Hume, Groen + Clement.
Attys March 12, 1963  E. R. SCHUMANN  3,081,034
THERMOSTATIC SHUT-OFF VALVE
Filed Aug. 10, 1960  2 Sheets-Sheet 2
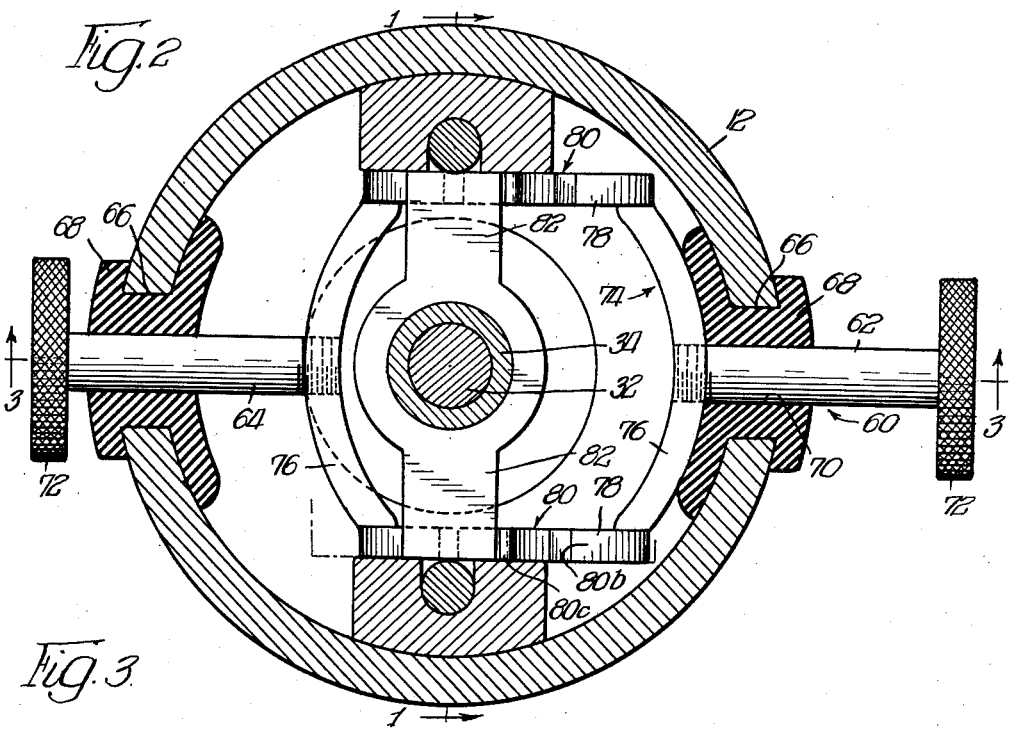
INVENTOR.
Eugene R. Schumann,
BY
Byron Hume, Groen + Clement
Attys.

United States Patent Office 3,081,034
Patented Mar. 12, 1963

3,081,034
THERMOSTATIC SHUT-OFF VALVE
Eugene R. Schumann, Franklin Park, Ill., assignor to The Powers Regulator Company, Skokie, Ill., a corporation of Illinois
Filed Aug. 10, 1960, Ser. No. 48,627
6 Claims. (Cl. 236—93)

This invention relates to valves and specifically to a thermostatic shut-off valve especially suited for use in residential type shower systems.

Normally a residential shower system includes a source of hot water and a source of cold water, both of which are connected by suitable conduits, controls, and fixtures to a shower head. One of the problems encountered in such a shower system is the diminution of the water pressure in one of the lines connected to the shower head. The lowering of the pressure in one of the lines causes either a sudden drop or rise in temperature. The serious aspect of this phenomena occurs when there is a sharp decrease in cold water pressure resulting in a sudden rise in temperature which leads to the discomfort, if not the scalding, of the user. For this reason it is necessary to provide some means for preventing sudden changes in temperature as the result of the failure or reduction of pressure in one of the lines supplying the water to the nozzle.

Numerous attempts have been made in the past for providing valve means for preventing the undesired effects of such reduction in pressure. Some of these attempts have been included as part of the mixing valve construction which supplies and controls the flow of water to the shower head. While mixing valves are normally effective in this capacity at the same time due to the fact that they must also provide other functions, such as the mixing and control of the water from their respective sources, they are somewhat expensive. Furthermore, the normal mixing valve with a temperature regulatory means may not insure a complete shut-off of the valve in the event of the complete failure of the pressure in one of the lines. Other attempts at constructing such valves have been unsatisfactory because the valves have been too expensive or else did not lend themselves to being incorporated into previously installed systems.

The need has arisen for a thermostatic shut-off valve that provides a positive shut-off in the event of the temperature rising above some predetermined point and which may be readily incorporated into previously installed systems. Furthermore, the shut-off valve should not interfere with the operation of elements already installed in the system. With this need in mind, a thermostatic shut-off valve has been invented meeting the requirements as set forth above.

A foremost object of the invention resides in the provision of a thermostatic shut-off valve that provides a positive shut-off in the event that the temperature reaches some predetermined level.

Another object of the invention resides in the provision of a thermostatic shut-off valve adapted to be installed for incorporation in previously installed residential-type shower systems.

Another object of the invention resides in the provision of a thermostatic shut-off valve adapted to be installed between the shower head and the conduit connecting the latter to a source of supply.

Another object of the invention resides in the provision of a thermostatic shut-off valve having means by which the user may open the valve after it has been closed due to the action of the thermostatic element therein, but which will return to the closed position in the event that the temperature has not returned to the desired predetermined range.

Another object of the invention resides in the provision of a thermostatic shut-off valve which is economical in construction.

These and other objects of the invention will be apparent upon reading of the specification with reference to the following drawings.

In the drawings:

FIGURE 1 is a sectional view taken along the lines 1—1 of FIG. 2 of one form of the valve embodying the invention.

FIGURE 2 is a sectional view taken along the lines 2—2 in FIG. 3.

FIGURE 3 is a sectional view taken along the lines 3—3 in FIG. 2.

As will be seen hereinafter the valve embodying the invention may be constructed of any suitable materials, which have the desired physical characteristics to provide the necessary results. By way of example, the elements, except where otherwise specified, may be constructed of materials such as metals, plastics, and the like.

For purposes of convenience the valve embodying the invention hereinafter will be described in terms of hot and cold water. It is to be understood that the subject valve may be utilized for controlling liquids other than water and for that reason the reference to water should not be considered as a limitation. It should also be noted that the reference to residential-type shower systems is merely by way of example and is not to be considered a limitation, since the valve may be utilized in other types of systems.

Referring now to FIG. 1 there is shown one form of the invention, generally denoted by the numeral 10. The thermostatic valve 10 includes a casing 12 having the female threads 14 at one end and the male threads 16 at the other end. The threads 14 and 16 facilitate the incorporation of the valve 10 into previously installed shower systems, particularly between the shower head and the conduit supporting water to the same, as was mentioned previously. The casing 12 is annular in shape and is slightly flared at one end and reduced at the other end. The relative size of the ends are merely for facilitating the incorporation of the valve 10 into the system.

The valve includes the valve seat assembly, generally denoted by the numeral 18 which fits within casing 12. The seat assembly 18 includes the annular portion 20 and the diametrically spaced posts 22. The posts 22 extend above and below the annular ring 20 as shown in FIG. 1. The annular ring 20 is in sealing engagement with the casing 12 as a result of the sealing ring 21 so that all of the water flowing into the valve must flow through the aperture 24.

At the upper end of the valve 10 as shown in FIG. 1, there is positioned the thermostatic valve control assembly, generally denoted by the numeral 26. The assembly 26 includes an expansible cartridge 28, which is adapted to expand and contract in accordance with variations in temperature. One form of expansible cartridge 28, which is especially suited in the construction of the invention, is that disclosed in the patent to Vernet No. 2,368,181. The Vernet cartridge includes a wax-like substance which undergoes a change in volume within a predetermined relatively short range of temperatures. In using this type of cartridge it is possible to provide a positive shut-off at some predetermined temperature without causing a substantial restriction in the flow until the level has substantially reached the predetermined maximum temperature. Thus, if the predetermined temperature should be set for 150° F. it is possible to select a thermal responsive cartridge of the type previously described in which there is little or no restriction experienced in the flow of water through the valve at any temperature more than 5° less than the 150° F. While the Vernet type of thermally responsive cartridge is especially suited for the construction of the invention, it is apparent that other types of thermally responsive type of apparatus may also be utilized.

The expansible material within the cartridge 28 abuts against a rubber piston 30 which, in turn, abuts against a piston or cylinder 32. The rubber piston 30 and the piston 32 are slidably mounted within a sleeve 34 which is secured in some suitable fashion at one end to the cartridge 28. The other end of the piston 32 is received within the stop member 36 which has a cup-like cross section and the outwardly extending annular flange 38.

A movable valve member 40 is slidably mounted on the sleeve 34 and is provided with the outwardly extending flange 42. The valve member 40 is adapted to be reciprocated on the sleeve 34 as will be explained hereinafter. In the preferred embodiment the valve member 40 is positioned os that the force of the water flowing through the valve 10 impinges upon the flange 42, so as to tend to drive it toward the annular seat 20. A light spring 41 is confined between the valve member 40 and the cartridge 28 for aiding the force of the water in driving the member 40 toward its seated position, as will be explained hereinafter.

A coil spring 46 is confined between the stop member 36 and the reaction member 48. The coil spring 46 biases the stop member 36 into abutting relationship with the sleeve member 34 when the temperature sensed by the thermostatic cartridge 28 is within the desired range. The flange 38 prevents the movement of the valve member 40 toward the valve seat 20.

The reaction member 48 is an elongate strip which extends across and is secured to the posts along with a similar strip 50 by means of the bolts 52. The strip 50 is provided with an aperture 54 in which is received a portion of the thermostatic cartridge 28 for confining it to its proper position within the sensing element assembly 26.

When the thermostatic cartridge 28 senses a temperature above the desired range or maximum, the material therein expands as mentioned previously so as to drive the pistons 30 and 32 downwardly as shown in FIG. 1. The downward movement of the pistons 30 and 32 forces the stop member 36 away from the end of the sleeve 34 against the force of the coil spring 46. If the temperature is sufficiently high, the stop member 36 and, specifically, the flange 38 will be forced below the level of the seating surface 20a of the valve seat 20. When the stop member 36 moves downward, the force of the water flowing through the valve 10 causes the valve member 40 to move downwardly toward engagement with the seating surface 20a. The spring 41 will aid the water in moving the valve member 40 during the initial movement of the latter. As the valve member 40 approaches the valve seat 20, the restriction to flow therebetween will increase, thus increasing the force on member 40 tending to move it toward the valve seat member 20. Normally the spring 41 is not needed, however, where extremely slow flow velocities are encountered it may be desired or needed to increase the rate of the movable valve member. If the stop member moves downwardly far enough, the pressure of the water will force the flange 42 into sealing engagement with the valve seat 20. Since the center of the movable valve member 40 is closed off by the sleeve 34 and the water cannot pass through the aperture 24 after the valve member 40 is in sealing engagement, the flow is completely interrupted.

It is to be noted that in a preferred embodiment the valve is built to include controlled leakage once it is closed. In this manner any hot water entrapped adjacent the cartridge can be exhausted so as to bring water below the maximum temperature into contact with the cartridge in the event the cold water pressure has returned, otherwise the valve might remain closed long after the need for doing such had ended.

As soon as the water temperature falls below the maximum the cartridge or the temperature sensitive material therein will contract thus permitting the stop member 36 to move toward its normal position. In moving toward its normal position the flange 38 will catch the valve 40 and lift it from its seated position so that flow is resumed.

It is noted that the valve 10 is provided with a safety feature which prevents damage to the valve in the event that there is a continued rise in temperature after the valve has been shut off. The safety feature takes the form of a lost motion connection between the stop member 36 and the movable valve member 40. In essence, the stop member becomes spaced or disconnected from the valve member 40 once the latter abuts the valve seat 20. A continued rise in temperature causes the stop member to be forced further downwardly against the spring 46. The spring 46 may be selected so that there is sufficient room for the maximum expansion of the thermal cartridge to accommodate all possible ranges of temperature for any particular type of system. In essence, the spring should be sufficiently long to accommodate the maximum expansion encountered with any specific cartridge without reaching its solid stack height.

Referring now to FIGS. 2 and 3 the valve 10 is provided with a reset assembly, generally denoted by the numeral 60, for aiding in the opening of the valve member 40 after it has been closed. The primary purpose of the reset assembly 60 is to aid the spring 46 in opening the valve member 40, particularly where relatively high pressures and velocities are encountered. When the valve is completely closed the full line pressure is on the valve. If the pressure should increase for some reason above its normal level it may hold the valve in its closed position against the force of the spring 46. Once the valve is cracked from its seat the force will be greatly reduced so that the valve member 40 will be snapped open by the spring 46. In the event that the temperature has not fallen below the maximum, the valve will be immediately reclosed so that the protection is continued.

The reset assembly 60 includes the plunger arms 62 and 64 which extend through the apertures 66 in the valve casing 12. A rubber seal 68 is mounted in each of the apertures 66 and is provided with the aperture 70 through which slidably extends the plunger arms 62 and 64. Each of the plunger arms is provided with a button 72 at its outer end for facilitating reciprocation thereof. At the other ends the plunger arms 62 and 64 are secured to the yoke assembly 74 by some suitable means. The yoke assembly 74 includes the arcuate end members 76 which are secured at their ends to the cam members 78.

As shown in FIG. 3 the cam members 78 are spaced so as to embrace the thermostatic valve assembly 26 and to permit movement as described previously of the stop member 36, the pistons 30 and 32, and the movable valve member 40. The outwardly extending flange 42 of the movable valve member 40 is closely spaced from the sides of the cam members 78 as shown in FIG. 2 when in its uppermost position. The end members 76 are cutaway, so as to permit them to slide over the flange 42 when the yoke assembly 76 is reciprocated between its extreme positions. The cam members 78 are provided with the cam surfaces 80 which consist of the two grooved sections 80a and 80b of substantially equal depth separated by a raised portion 80c.

The movable valve member 40 is provided with the radially extending cam follower arms 82 the ends of which are coincident with the outer edges of the cam members 78 and the cam surface 80. The cross sections of the outwardly extending arms 82 are generally triangular in shape with the triangle being of the same general shape and size as the grooves 80a and 80b in the cam members 80. When the valve member 40 is in its lowermost position, the arms 82 are resting at the bottom of one of the grooves 80a and 80b. Conversely, when the valve 40 is in its uppermost position the arms 82 will be spaced from the cam members 78 and will clear the raised portions 80c.

In the event that the valve becomes closed, it may be raised from its seating position by forcing the outermost button 72 toward the casing 12. This causes the arms 82 to slide over the raised portions 80c of the cam surfaces 80, thus lifting the valve 40 from its seated position. If the button is forced to its innermost position the arm 82 will become aligned with the other groove portions in the cams 78, so that the valve is free to move downwardly again. If the temperature of the water after the momentary opening of the valve 40 is below the predetermined maximum, due to the restoration of the cold water, the valve 40 will remain open. On the other hand should the temperature remain at or above the maximum, then the valve 40 will be forced into its closed position by the pressure of the water.

It is to be noted that the raised portion 80c is designed so that its apex is relatively small, thus minimizing the tendency for the arms 82 to remain perched thereon in the event the water temperature is above the maximum. Furthermore, the arms 62 are freely reciprocal within the sealing members 68, so that should the assembly 74 be inadvertently left at an intermediate position, the valve 40 will force the reset assembly to one of its extreme positions, thus permitting the valve to resume its closed position. In this manner it is possible to minmize the chances of inadvertently leaving the cam members in their intermediate positions whereby the thermal shut-off mechanism is left inoperative.

It can now be seen that the subject invention provides a thermostatic shut-off valve which is especially suited for use in residential-type shower and plumbing systems. The valve lends itself to be constructed of low-cost materials and to be manufactured in accordance with the high-production techniques that are in conventional use. It is to be noted that although specific terms and constructions are disclosed in the specification that these are merely by way of example and not be to considered as limitations. It is apparent that certain modifications may be made within the scope of the claims, without departing from the spirit of the invention.

I claim:

1. A thermostatic shut-off valve comprising a valve seat member through which the liquid flows, a movable valve member cooperating with said seat member for controlling the flow through the latter, spring means when in an etxended position engaging said valve member and biasing the same into its open position, means for sensing the temperature of said liquid, said means upon sensing a predetermined liquid temperature compressing said spring means from said extended position, said movable valve member being relieved from the pressure of said spring means when said spring means is compressed from said extended position, said movable valve member further being positioned in the path of said liquid flowing through said valve so that said valve member is moved by said liquid into engagement with said valve seat member when said spring means is compressed from said extended position.

2. A thermostatic shut-off valve comprising a valve seat member through which the liquid flows, a movable valve member cooperating with said valve seat member for controlling the flow through the latter, spring means when in an extended position engaging said valve member and biasing the same into its open position, means for sensing the temperature of said liquid, said means upon sensing a predetermined liquid temperature compressing said spring means from said extended position, said movable valve member being movable from said open position towards said valve seat member by relief from said spring means when the latter is compressed from said extended position, said movable valve member further being positioned in the path of said liquid flowing through said valve so that said valve member is moved by said liquid into engagement with said valve seat member when said spring means is compressed from said extended position.

3. A thermostatic shut-off valve according to claim 2 further including means for lifting said valve member from said valve seat member independently of said means for sensing temperature of said liquid.

4. A thermostatic shut-off valve for limiting the temperature of a liquid comprising a casing having inlet and outlet ports for permitting ingress and egress of liquid to and from said valve, a valve seat member mounted within said casing, having an aperture therein through which the liquid flows, a movable valve member co-axially aligned with said aperture, cooperating with said seat member for controlling the flow through said aperture, a coil spring means extending upwardly through said aperture abutting said valve member and biasing it into its normally open position, and a thermally responsive element adapted to expand upon sensing a predetermined temperature, said thermally responsive element being connected to said coil spring means for compressing the same toward said aperture to permit movement of said movable valve member toward said valve seat, said movable valve member being positioned in the path of the liquid flowing through the valve so that said liquid forces said valve member toward said valve seat member into engagement with said spring means at least until it becomes seated on said valve seat member.

5. A thermostatic shut-off valve for limiting the maximum temperature of a liquid comprising a casing having inlet and outlet ports for permitting ingress and egress of liquid to and from said valve, a valve seat member mounted within said casing, having an aperture therein through which the liquid flows, a movable valve member co-axially aligned with said aperture, cooperating with said seat member for controlling the flow through said aperture, a coil spring means extending upwardly through said aperture for detachably abutting said valve member so as to bias it into its normally open position, a thermally responsive element mounted in the path of said stream of liquid and adapted to expand upon sensing a predetermined temperature, said thermally responsive element being connected to said coil spring means for compressing the same toward said aperture so as to detach the same from said valve member to permit movement of the latter toward said valve seat, said movable valve member being positioned in the path of the liquid flowing through said valve so that said liquid forces said valve member toward said valve seat member into engagement with said coil spring means at least until it becomes seated on said valve seat member, said movable valve member including cam follower means, and cam means operatively associated with said cam follower means for momentarily raising said movable valve member from its seated position during the expanded condition of said thermally responsive means.

6. A thermostatic shut-off valve adapted to be installed in a residential-type shower system for limiting the maximum temperature of the water sprayed from the shower head and further adapted to be connected to a source of hot and cold water comprising a casing having inlet and outlet ports for permitting ingress and egress of water to and from said valve, a valve seat member mounted within said casing having an aperture therein through which the water flows, a movable valve member co-axially aligned with said aperture, cooperating with said seat member for controlling the flow through said aperture, a coil spring means extending upwardly through said aperture and detachably abutting said valve member so as to bias it into its normally open position, a thermally responsive element mounted in the path of water and adapted to expand upon sensing said predetermined maximum temperature, said thermally responsive element being connected to said coil spring means for compressing the same toward said aperture to detach said spring means from said valve member so as to permit movement of the latter toward said valve seat, said movable valve member being positioned in the path of the liquid flowing through said valve so that said liquid forces said valve member toward said valve seat member into engagement with said coil spring means at least until it becomes seated on said valve seat member, cam follower means mounted on said movable valve member, and cam means operatively associated with said cam follower means for momentarily raising said movable valve member from its seated position while said thermally responsive means is in its expanded condition.

References Cited in the file of this patent

UNITED STATES PATENTS

| | | |
|---|---|---|
| 2,165,171 | Zinkil | July 4, 1939 |
| 2,387,792 | Holmes | Oct. 30, 1945 |
| 2,400,615 | Warrick et al. | Mar. 21, 1946 |
| 2,419,630 | Cruzan et al. | Apr. 29, 1947 |

FOREIGN PATENTS

| | | |
|---|---|---|
| 421,938 | Great Britain | Jan. 2, 1935 |

OTHER REFERENCES

German printed application, 1,035,408, July 31, 1958.

UNITED STATES PATENT OFFICE
CERTIFICATE OF CORRECTION

Patent No. 3,081,034                      March 12, 1963

Eugene R. Schumann

It is hereby certified that error appears in the above numbered patent requiring correction and that the said Letters Patent should read as corrected below.

Column 1, line 59, for "adapted to be installed" read -- that is especially suited --; column 2, line 38, for "supporting" read -- supplying --; column 3, line 18, for "os" read -- so --; line 32, for "elongate" read -- elongated --; column 5, line 27, for "minmize" read -- minimize --.

Signed and sealed this 12th day of November 1963.

(SEAL)
Attest:

ERNEST W. SWIDER                      EDWIN L. REYNOLDS

Attesting Officer                    Acting Commissioner of Patents